(12) United States Patent
Taniguchi et al.

(10) Patent No.: US 9,737,955 B2
(45) Date of Patent: Aug. 22, 2017

(54) WELDED JOINT MANUFACTURED BY METHOD OF RESISTANCE SPOT WELDING

(71) Applicant: JFE STEEL CORPORATION, Tokyo (JP)

(72) Inventors: Koichi Taniguchi, Chiba (JP); Yasuaki Okita, Chiba (JP); Rinsei Ikeda, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 467 days.

(21) Appl. No.: 14/357,016

(22) PCT Filed: Nov. 6, 2012

(86) PCT No.: PCT/JP2012/007099
§ 371 (c)(1),
(2) Date: May 8, 2014

(87) PCT Pub. No.: WO2013/076925
PCT Pub. Date: May 30, 2013

(65) Prior Publication Data
US 2014/0308070 A1   Oct. 16, 2014

(30) Foreign Application Priority Data
Nov. 25, 2011 (JP) .................. 2011-256906

(51) Int. Cl.
*B23K 11/11* (2006.01)
*B23K 11/16* (2006.01)

(52) U.S. Cl.
CPC ............. *B23K 11/11* (2013.01); *B23K 11/115* (2013.01); *B23K 11/16* (2013.01); *Y10T 403/478* (2015.01)

(58) Field of Classification Search
CPC ........................... B32B 15/011; B23K 11/115
See application file for complete search history.

(56) References Cited

U.S. PATENT DOCUMENTS 6,709,535 B2 * 3/2004 Utsumi .................. C22C 38/02
148/334
2012/0141829 A1   6/2012 Oikawa et al.

FOREIGN PATENT DOCUMENTS

JP  A-2008-229720   10/2008
JP  A-2009-1839    1/2009
(Continued)

OTHER PUBLICATIONS

Aug. 21, 2015 extended Search Report issued in European Patent Application No. 12851978.2.
(Continued)

Primary Examiner — Michael P Ferguson
(74) Attorney, Agent, or Firm — Oliff PLC (57) ABSTRACT

In a welded joint manufactured by a method of resistance spot welding thin steel sheets, when the diameter of a nugget formed from the thin steel sheets is denoted by d, on a horizontal plane passing through a nugget surrounded by a corona bond, distribution of an amount of P in a region in the nugget surrounded by a closed curve at a distance d/100 from an end portion of a weld zone toward the inside of the nugget and a closed curve at a distance d/5 from the end portion of the weld zone toward the inside of the nugget is analyzed by area analysis, and the proportion of the region in terms of area in which the concentration m (mass %) of P is more than twice the concentration M (mass %) of P of a base metal composition is 5% or less.

8 Claims, 3 Drawing Sheets

(56) References Cited

FOREIGN PATENT DOCUMENTS

| JP | A-2010-59451 | 3/2010 |
|----|----|----|
| JP | A-2010-149187 | 7/2010 |
| WO | WO 2011/025015 A1 | 3/2011 |

OTHER PUBLICATIONS

International Search Report issued in International Patent Application No. PCT/JP2012/007099 dated Jan. 29, 2013.

* cited by examiner

WELDED JOINT MANUFACTURED BY METHOD OF RESISTANCE SPOT WELDING

TECHNICAL FIELD

The present invention relates to a welded joint having a high tensile strength manufactured by a method of resistance spot welding, which is a type of lap resistance welding.

BACKGROUND ART

In recent years, the tensile strengths of a steel sheet have been increased to achieve increase in the reliability of automobile bodies and decrease in the weight of automobile bodies for the purpose of reduction in emissions. By using high strength steel sheets for automobile bodies, the same level of rigidity can be obtained with thickness and weight that are less than those of conventional steel sheets. However, it has been pointed out that high-tensile steel sheets have some problems. One of the problems is that the quality of weld zones in assembling an automobile body decreases as the strength of steel sheet increases.

Figure 1:
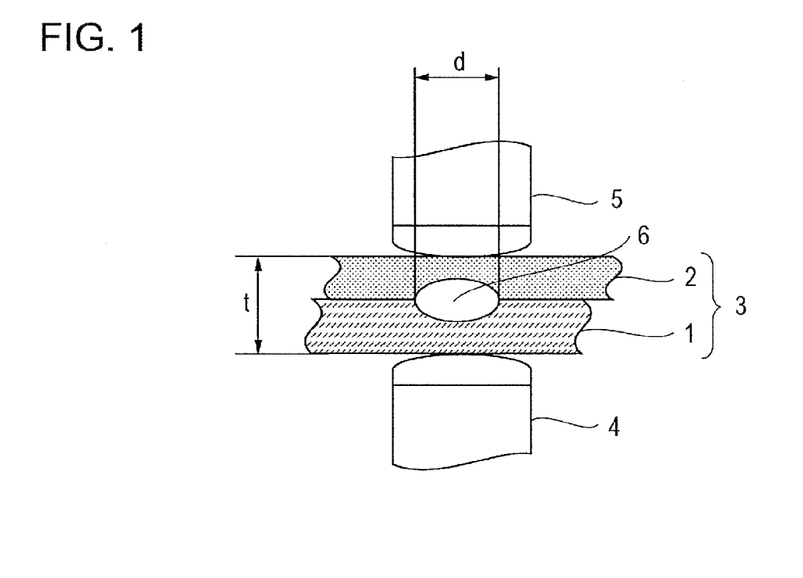
FIG. 1 is a schematic view illustrating a resistance spot welding method according to an embodiment of the present invention.

As illustrated in FIG. 1, resistance spot welding is a method of obtaining a welded joint by clamping a sheet set 3 of two or more lapped steel sheets (in this case, a lower steel sheet 1 and an upper steel sheet 2) between a pair of upper and lower electrode tips (a lower electrode tip 4 and an upper electrode tip 5), pressing and welding the sheet set 3 so as to melt the sheet set 3, and forming a nugget 6 having a necessary size.

The quality of a joint obtained in this way is evaluated in terms of whether a sufficient nugget diameter is obtained, or by testing the tensile shear strength (the strength of the joint when a tensile test is performed by applying tension in a shearing direction of the joint), the cross tension strength (the strength of the joint when a tensile test is performed by apply tension in a peeling direction of the joint), the fatigue strength, and the like of the joint. Among these, the static strengths such as the tensile shear strength and the cross tension strength are very important as an index of the quality of a welded joint.

In particular, the tensile shear strength of a spot weld zone tends to increase as the tensile strength of a steel sheet increases. However, the cross tension strength increases only negligibly or may even decrease as the tensile strength of a steel sheet increases. It is considered that this is because the hardness of a weld zone and a heat-affected zone increases and thereby the toughness of these zones decreases, since the carbon equivalent Ceq of a high strength steel sheet, which is represented by the following equation (1) or the like, is inevitably large in order to achieve its high strength and since a welding is a process including rapid heating and rapid cooling.

$$Ceq = C + \tfrac{1}{24} \times Si + \tfrac{1}{6} \times Mn (\%) \tag{1}$$

Here, "%" means mass %.

To ensure the joint strength when using a high strength steel sheet, the welding method may be improved by increasing the number of welding spots or by increasing the nugget diameter. However, increase in the number of welding spots would increase the influence of a shunt current, and also increase the operation time and therefore decrease the productivity. To increase the nugget diameter, it is necessary to increase the size of electrodes and increase the electrode force applied to the steel sheets to prevent spatter (expulsion) of a weld metal. These are constrained by the equipment and also have a disadvantage that the characteristics of a base metal may be impaired because the heat-affected zone is enlarged.

Therefore, various attempts have been made in order to ensure the strength of a welded joint with the number of spots and a nugget diameter that are equal to or less than those of existing methods. In particular, a large number of studies have been made regarding a tempering postheating method, which is a method in which a nugget and a HAZ are softened after making a weld solidified, quenched and then reheated. This method aims at increasing the strength of a welded joint by increasing the toughness of a nugget and reducing stress concentration in the vicinity of a weld.

Therefore, the quality certification of a joint has been often studied by focusing on the hardness. For example, in Patent Literatures 1 and 2, it is described that the hardness of a nugget and a heat-affected zone is measured and high strength of a joint portion can be certified if the measured hardness is in a certain range.

CITATION LIST

Patent Literature

PTL 1: Japanese Unexamined Patent Application Publication No. 2008-229720
PTL 2: Japanese Unexamined Patent Application Publication No. 2009-001839

SUMMARY OF INVENTION

Technical Problem

However, decrease in hardness is not necessarily preferable, because it has been pointed out that decrease in hardness causes decrease in tensile shear strength. Therefore, it is necessary to use an index other than hardness in order to ensure the strength of a welded joint manufactured by a method of resistance spot welding.

An object of the present invention is to provide a method of a resistance spot weld sheet set including a high strength steel sheet with which the aforementioned problems are solved and a joint strength can be ensured by using an index that is not dependent on hardness.

Solution to Problem

To solve the aforementioned problems, the inventors carried out an intensive study on a welded joint having high cross tension strength formed by resistance spot welding a sheet set including a high tensile strength steel sheet.

First, what factor determines a joint strength was examined by using a dual phase steel having a tensile strength of 980 MPa. As described above, tensile shear strength and cross tension strength are typical measures of the static strength of a resistance spot welded joint. As the strength of a steel sheet increases, the tensile shear strength tends to increase while the cross tension strength tends to decrease. Therefore, the inventors regard the cross tension strength as more important and continued examination.

It is known that there is a correlation between the cross tension strength (CTS) and the failure mode of a resistance spot welded joint. That is, a interface failure, which passes through a nugget, occurs in a low CTS welded joint, and as CTS increases, the failure mode shifts to a plug failure, in which one of the steel sheets comes off while the other steel sheet is left in a button-like shape. That is, it is important to prevent interface failure in order to ensure CTS. Because interface failure is a phenomenon in which fracture propagates in a nugget, the influence of the microstructure of a nugget and the segregation state of a metal element on the fracture was examined.

While carrying out the examination, it was found that a certain pattern of segregation in a nugget may cause generation of a crack. By examining various conditions, it was found that a dendrite structure was changed by performing re-heating after forming a nugget and cooling the nugget. By performing numerical analysis for evaluation, it was found that there were cases where martensitic transformation had not started during the cooling time.

By examining various conditions, it was found that, by performing reheating until the dendrite structure diminishes, the failure mode changed from interface failure to plug failure and the CTS strength could be increased, although the nugget diameter did not change. In this case, the hardness of the nugget did not change, and the microstructure did not differ significantly from that of a case where only main welding was performed.

By analyzing the change in the dendrite structure in detail using FE-EPMA (field emission electron probe microanalyzer), it was found that the distribution of a metal component of a nugget, in particular, the distribution of phosphorous (P), changed. The distribution of P showed a sharp peak corresponding to the dendrite structure, at which the concentration of P was in the range of twice to ten times that of a base metal structure. On the other hand, it was found that, with joints where the dendrite structure decreased or disappeared, the concentration of P was approximately twice that of the base metal structure or lower.

From these facts, the inventors found that, to ensure the strength of a nugget, it is necessary that the concentration distribution of P in a region that is within a certain distance from an end of a corona bond, in which a crack is most likely to occur, be at a low level.

The present invention, which has been achieved based on these findings, has the following characteristics.

(1) In a welded joint manufactured by a method of resistance spot welding thin steel sheets, when the diameter of a nugget formed from the thin steel sheets is denoted by d, on a horizontal plane passing through a nugget surrounded by a corona bond, distribution of an amount of P in a region in the nugget surrounded by a closed curve at a distance d/100 from an end portion of a weld zone toward the inside of the nugget and a closed curve at a distance d/5 from the end portion of the weld zone toward the inside of the nugget is analyzed by area analysis, and the proportion of the region in terms of area in which the concentration m (mass %) of P is more than twice the concentration M (mass %) of P of a base metal composition is 5% or less.

(2) In the welded joint manufactured by method of resistance spot welded joint according to (1), the number of the thin steel sheets is three or more.

Advantageous Effects of Invention

With the present invention, provided is a high strength welded joint manufactured by a method of resistance spot welding a sheet set of two or more steel sheets including at least one high tensile steel sheet, with which segregation in a nugget and generation of a crack is reduced and thereby interface failure is prevented without reducing the hardness of the welded joint.

DESCRIPTION OF EMBODIMENTS

An embodiment of the present invention will be described with reference to the drawings.

A welding machine that can be preferably used to form a welded joint according to the present invention includes a pair of upper and lower electrode tips, can press and weld a portion to be welded by clamping the portion between the pair of electrode tips, and includes a electrode force controller and a weld current controller that can respectively control the electrode force and weld current appropriately during welding. The mechanism for pressing (an air cylinder, a servo motor, or the like), the mechanism for controlling a weld current (whether to use an alternating current, a direct current, or the like), and the type of the welding machine (a stationary type, a robot gun, or the like) and the like are not particularly limited.

Figure 2:
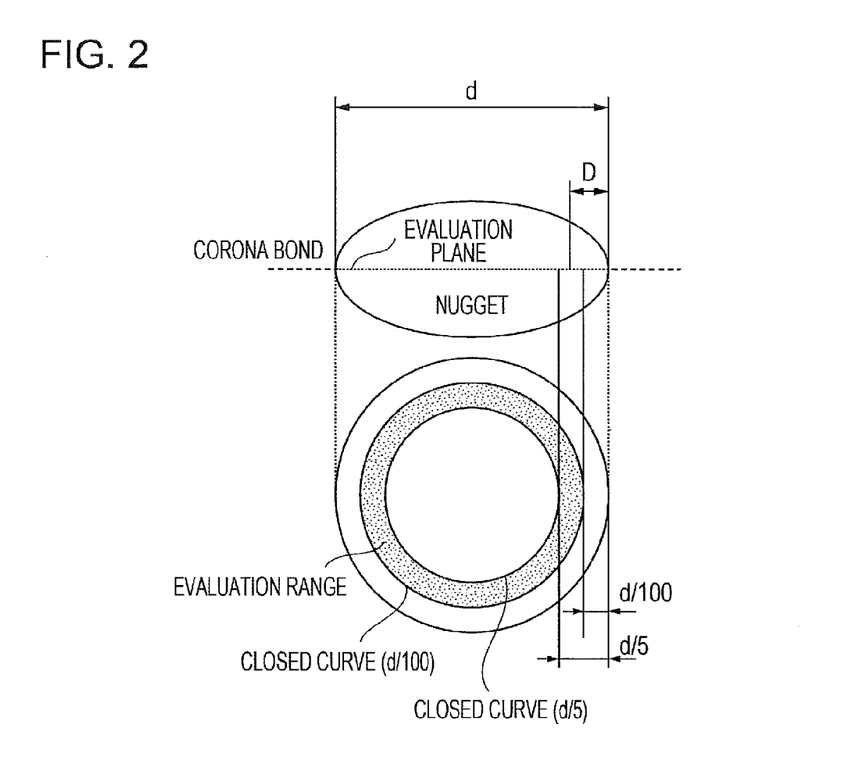
FIG. 2 is a schematic view illustrating a nugget and an analysis-measurement range.

Regarding the joint, when the diameter of a nugget formed from two thin steel sheets is denoted by d, on a horizontal plane passing through a nugget surrounded by a corona bond, distribution of the amount of P is evaluated by performing an area analysis from an end portion of a weld zone toward the inside of the nugget. However, because it is supposed that spot welding is performed in an axially symmetric manner, a part of this range may be selected and used for evaluation. FIG. 2 illustrates a region in the nugget surrounded by a closed curve at a distance d/100 and a closed curve at a distance d/5 and the relationship between lengths used for evaluation. In FIG. 2, "closed curve (d/100)" and "closed curve (d/5)" respectively denote the closed curve at a distance d/100 and the close curve at a distance d/5 from an end of a weld zone toward the inside of the nugget. Because FIG. 2 is a schematic view, the closed curves are shown as perfect circles. In practice, the closed curves are not necessarily perfectly circles and may be slightly different from perfect circles, although they are substantially circular.

Here, a plane passing through a nugget surrounded by a corona bond is used, because the strength of a corona bond is generally low and peeling off first occurs at the corona bond and a crack propagates in the nugget in cross tension test, and therefore this plane is the most suitable for evaluation. However, because a direction in which a crack propagates may be deflected upward or downward depending on the strength of the corona bond, a range within 1/10 of the nugget thickness from the corona bond in the vertical direction may be used as the measurement range.

The distance d/100 from an end portion of a weld zone is used because the solidified end portion is partially melted and is not subjected to the present evaluation. The distance d/5 from an end portion of a weld zone is used because a range that may influence a crack is up to the distance d/5. It is preferable that the upper limit be d/10 or less, which defines a narrower range.

The amount of P in a selected part or the entirety of the aforementioned region is analyzed by performing area analysis. Analysis using EPMA is the most suitable for the present evaluation.

The area in which the concentration m (mass %) of P is more than twice the concentration M (mass %) of P of the base metal composition is obtained, and the proportion of this area to the area of the region surrounded by the aforementioned two closed curves is evaluated.

In a case where the sheet set includes two steel sheets having the same chemical composition, the concentration M (mass %) of P of the base metal composition is defined as the concentration (mass %) of P included in the steel sheets. In a case where steel sheets having different compositions (P1,P2) (mass %) and different thicknesses (t1,t2) (mm) are used, the concentration of P can be calculated as $P=(P1 \times t1 + P2 \times t2)/(t1 + t2)$.

Figure 3:
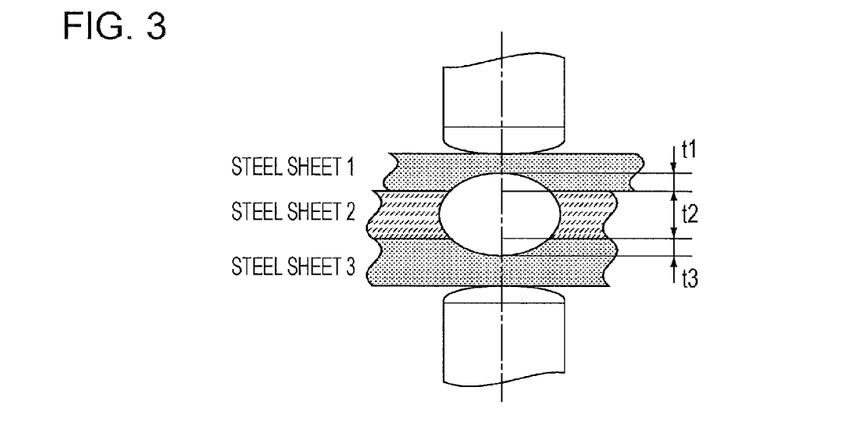
FIG. 3 illustrates an evaluation of a concentration M of P (phosphorus) of the base metal composition when a sheet set of three sheets is used.

In a case where the number of steel sheets is three, since it is considered that the steel sheet 2 is entirely melted in contrast to the steel sheets 1 and 3 as illustrated in FIG. 3, the concentration (mass %) of P included in the steel sheets is represented as $P=(P1 \times t1 + P2 \times t2 + 3 \times t3)/(t1+t2+t3)$, where t1 to t3 are the thicknesses of the nugget along the axis of the electrodes, which is obtained by cutting and observing a cross section of the nugget after welding.

Likewise, in a case where the number of steel sheets is n that is greater than three, P can be represented as $P=(P1 \times t1 + P2 \times t2 + P3 \times t3 + \ldots + Pn \times tn)/(t1 + t2 + t3 + \ldots + tn)$, where t1 to tn are the thicknesses of the nugget.

Figure 4:
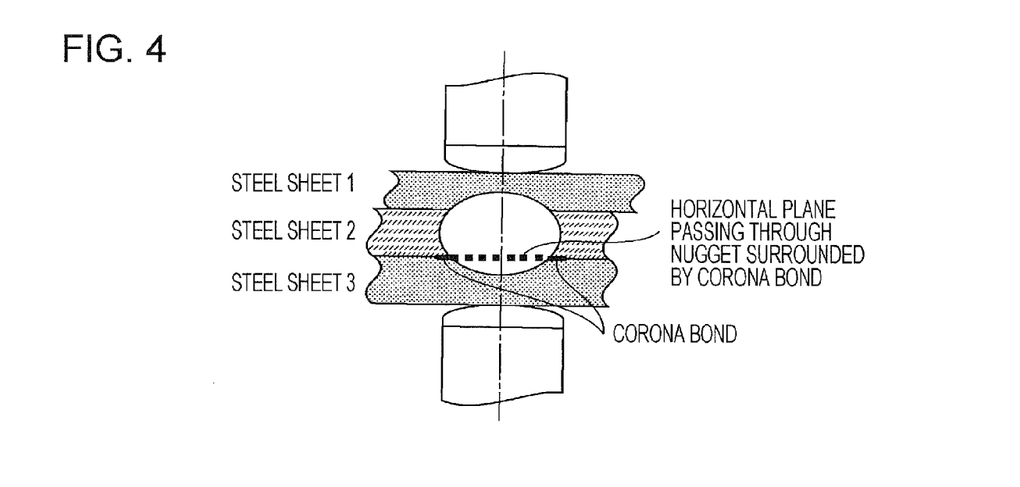
FIG. 4 is a schematic view illustrating a corona bond of the base metal composition when a sheet set of three sheets is used.

The phrase "a horizontal plane passing through a nugget surrounded by a corona bond of a sheet set of three or more sheets" refers to a horizontal plane passing through a nugget surrounded by a corona bond that exists on an interface between a pair of sheets for which the joint strength is to be evaluated. For example, when evaluating the joint strength of the steel sheet 2 and the steel sheet 3 in FIG. 4, the corona bond is shown by solid lines and the horizontal plane passing through the nugget surrounded by the corona bond is shown by a dotted line.

It is required that the proportion of the region in terms of area in which the concentration m (mass %) of P is more than twice the concentration M (mass %) of P of the base metal composition be 5% or less.

The condition that the concentration m (mass %) of P is more than twice the concentration M (mass %) of P of the base metal composition is used, because brittle fracture due to solidifying segregation frequently occurs if the concentration of P is more than twice. The condition that the proportion in terms of area is 5% or less is used because initiation of fracture can be sufficiently prevented by making the proportion be 5% or less.

As described above, analysis using EPMA is the most suitable for the present evaluation. However, analysis using EDX or WDX may be performed. When performing analysis using EPMA, it is preferable that the analysis be performed under the following conditions: acceleration voltage of 13 to 17 kV, irradiation current $1 \times 10^{-7}$A or higher and $3 \times 10^{-7}$A or lower, beam diameter of 1 to 3 µmϕ, number of steps of 1 to 3 µm, and gate time of 3 to 10 s/points.

Area analysis is performed in the aforementioned range, and the proportion in terms of area is calculated. However, evaluation may be performed more simply by line analysis. The proportion in terms of area can be obtained using an image analyzer. By making the proportion in terms of area be 3% or less, a more preferable high strength joint, in which the influence of P is reduced further, can be obtained.

There are several methods for manufacturing a resistance spot welded joint in which the proportion of the region in terms of area in which the concentration m (mass %) of P is more than twice the concentration M (mass %) of P of the base metal composition is 5% or less. In the examples described below, resistance spot welding is performed such that a main step of forming a nugget is performed first, a non-welding step for cooling is performed next, and then a re-welding step (post-step welding) is performed twice. In this case, it is necessary that the nugget diameter at the interface between two steel sheets forming a corona bond be in the range of $3\sqrt{t}$ to $6\sqrt{t}$, where t is the thickness of the thinner one of the two steel sheets. This is required for ensuring the minimum necessary nugget diameter in resistance spot welding while preventing the nugget diameter and the influence of heat from becoming too large.

After the nugget has been formed, an electric current is not applied for a non-welding time Tc in the range of 4 to 30 cycles (1 cycle corresponds to 0.02 s). This is because it is necessary that the nugget be solidified to the minimum required degree while it is inefficient if the nugget is cooled excessively and it becomes necessary to perform reheating. Subsequently, two-step welding is performed. To prevent expulsion due to rapid welding, an electric current Ip1 for the first-step welding is set lower than an electric current Ip2 for the second-step welding. It is preferable that Ip2 be higher than Im because it is necessary to increase the temperature of the nugget so that P can be sufficiently dispersed. To restrain an increase in welding time, it is preferable that the sum of two-step welding times $Tp = Tp1 + Tp2$ be 20 cycles or less. It is not necessary that the joint be heated only in the process of resistance spot welding, and the joint may be heated by using a post-heating device using an induction heating method or the like.

EXAMPLE 1

Figure 5:
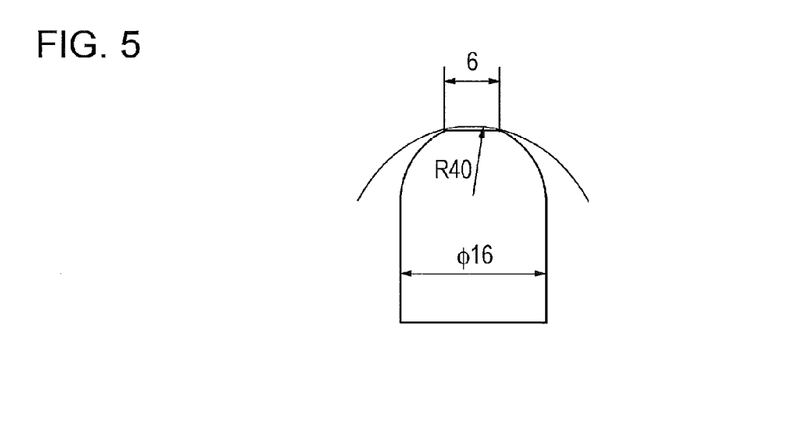
FIG. 5 is a schematic sectional view illustrating the shape of an electrode (electrode used in examples).

As an example of the present invention, as illustrated in FIG. 1, a resistance spot welded joint was formed by welding the sheet set 3, which included two lapped steel sheets (the lower steel sheet 1 and the upper steel sheet 2), by using a resistance welding machine. The resistance welding machine, which was attached to a welding gun, was of a servo motor pressing type using a single-phase current (50 Hz). As illustrated in FIG. 5, a pair of electrode tips (the lower electrode tip 4 and the upper electrode tip 5) used in this example were both Dome-type electrodes with made of an alumina-dispersed copper, each having an end portion having a radius of curvature of R40 and a diameter of 6 mm.

Steel sheets of the same type (having the same chemical composition) and having the same thickness were used as test pieces of the lower steel sheet 1 and the upper steel sheet 2, which were cold-rolled steel sheets having a tensile strength of 780 MPa, 980 MPa, 1180 MPa, and 1470 Mpa. By using these steel sheets, welding and cross tension test were performed in accordance with JIS Z3137.

Figure 6:
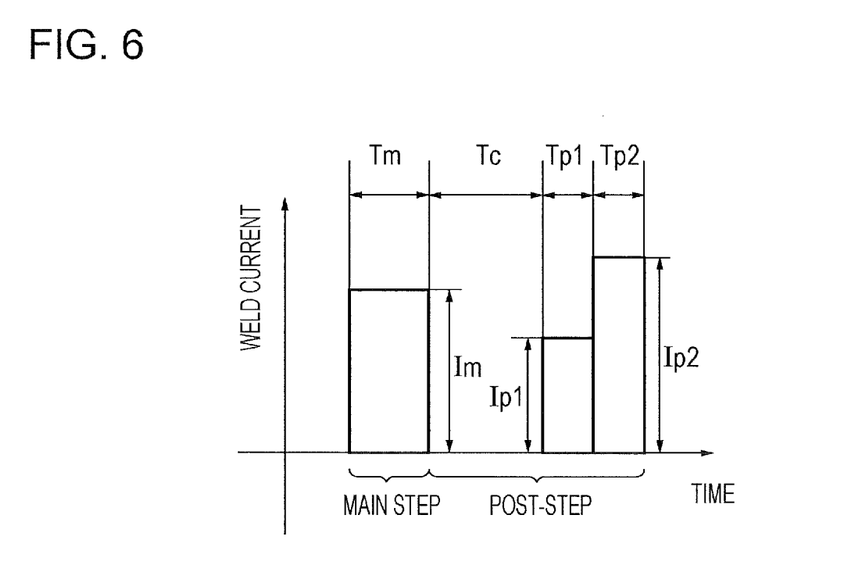
FIG. 6 is a schematic diagram illustrating the relationship between a welding time and an electric current according to the embodiment of the present invention.

In invention examples, resistance spot welding was performed in accordance with the embodiment of the present invention described above. In this case, as shown in FIG. 6, a non-welding step of pressing without welding was performed (for a non-welding time Tc), and re-welding step of applying an electric current (Ip1,Ip2) was performed twice (for post-step welding times Tp1 and Tp2).

In related-art examples, resistance spot welding including only a main step was performed.

Table 1 shows the welding conditions and the results of welding according to the invention examples, the related-art examples, and the comparative examples. Welding conditions that are not shown in this table (for example, squeeze time or slope time) were not set. It was confirmed that the nugget diameter was not increased as a result of performing the post-step welding.

After welding was finished, on a plane passing through a nugget surrounded by a corona bond, area analysis was performed using EPMA to obtain the distribution of P by observing five areas each having a size of 30 μm square, which were randomly selected from a region in the nugget surrounded by a closed curve at a distance d/100 from an end portion of a weld zone toward the inside of the nugget and a closed curve at a distance d/5 from the end portion of the weld zone toward the inside of the nugget, that is, an annular region at a distance in the range of d/100 to d/5 from the end portion of the weld zone. The proportion of a segregation portion in terms of area in which the amount of P is more than twice the amount M of P of the base metal was evaluated.

Furthermore, cross tension test was performed on these joints and a load when fracture occurred was compared with each other. Cases where the tensile strength increased as compared with the related-art examples were classified as "O" and cases where the tensile strength decreased were classified as "X".

As a result, it was confirmed that, in the invention examples, the area in which P was highly concentrated decreased and the cross tension strength increased as compared with the related-art examples and the comparative examples.

TABLE 1

| Test No. | Tensile Strength of Steel Sheet (Mpa) | Sheet Thickness t (mm) | Electrode force (kN) | Main Step | | Post-step | | | Post-step | | Area Proportion[1] | Cross Tension Strength (kN) | Increase | Remark |
|---|---|---|---|---|---|---|---|---|---|---|---|---|---|---|
| | | | | Weld Current Im (kA) | Weld Time Tm (cycles) | Non-Weld Time Tc (cycles) | Weld Current Ip1 (kA) | Weld Time Tp1 (cycles) | Weld Current Ip2 (kA) | Weld Time Tp2 (cycles) | | | | |
| 1 | 780 | 1.6 | 3.5 | 6 | 14 | — | — | — | — | — | 8 | 7.2 | — | Related-art Example |
| 2 | 780 | 1.6 | 3.5 | 6 | 14 | 0 | 5.0 | 20 | — | — | 9 | 7 | X | Comparative Example |
| 3 | 780 | 1.6 | 3.5 | 6 | 14 | 0 | 5.5 | 20 | — | — | 8.3 | 6.8 | X | Comparative Example |
| 4 | 780 | 1.6 | 3.5 | 6 | 14 | 4 | 4.2 | 4 | 6.0 | 4 | 2.7 | 10.2 | O | Invention Example |
| 5 | 780 | 1.6 | 3.5 | 6 | 14 | 6 | 4.8 | 3 | 6.6 | 3 | 2.6 | 10.4 | O | Invention Example |
| 6 | 780 | 1.6 | 3.5 | 6 | 14 | 8 | 5.4 | 2 | 7.2 | 2 | 3 | 10 | O | Invention Example |
| 7 | 980 | 1 | 3.5 | 5.5 | 14 | — | — | — | — | — | 7.3 | 4.2 | — | Related-art Example |
| 8 | 980 | 1 | 3.5 | 5.5 | 14 | 4 | 3.9 | 4 | 6.6 | 4 | 3.4 | 5.2 | O | Invention Example |
| 9 | 980 | 1 | 3.5 | 5.5 | 14 | 6 | 4.4 | 3 | 6.1 | 3 | 3.4 | 5.3 | O | Invention Example |
| 10 | 980 | 1 | 3.5 | 5.5 | 14 | 8 | 5.0 | 2 | 6.1 | 2 | 4.5 | 4.8 | O | Invention Example |
| 11 | 1180 | 1.2 | 3.5 | 6 | 14 | — | — | — | — | — | 8.1 | 4.8 | — | Related-art Example |
| 12 | 1180 | 1.2 | 3.5 | 6 | 14 | 4 | 5.4 | 2 | 6.0 | 4 | 3.3 | 6.5 | O | Invention Example |
| 13 | 1180 | 1.2 | 3.5 | 6 | 14 | 6 | 4.8 | 3 | 6.6 | 3 | 3.2 | 6.2 | O | Invention Example |
| 14 | 1180 | 1.2 | 3.5 | 6 | 14 | 8 | 4.2 | 4 | 7.2 | 2 | 3.9 | 5.4 | O | Invention Example |
| 15 | 1180 | 2 | 3.5 | 6 | 14 | — | — | — | — | — | 7.5 | 7.5 | — | Related-art Example |
| 16 | 1180 | 2 | 3.5 | 6 | 14 | 6 | 4.2 | 4 | 6.0 | 4 | 3.3 | 11.5 | O | Invention Example |
| 17 | 1180 | 2 | 3.5 | 6 | 14 | 8 | 4.8 | 3 | 6.6 | 3 | 2.9 | 12.3 | O | Invention Example |
| 18 | 1180 | 2 | 3.5 | 6 | 14 | 10 | 5.4 | 2 | 7.2 | 2 | 4.3 | 9.1 | O | Invention Example |
| 19 | 1470 | 1.6 | 3.5 | 6 | 14 | — | — | — | — | — | 8.4 | 6.5 | — | Related-art Example |
| 20 | 1470 | 1.6 | 3.5 | 6 | 14 | 4 | 4.2 | 4 | 6.0 | 4 | 3.5 | 9.2 | O | Invention Example |
| 21 | 1470 | 1.6 | 3.5 | 6 | 14 | 6 | 4.8 | 3 | | | | | | |
| 22 | 1470 | 1.6 | 3.5 | 6 | 14 | 8 | 5.4 | 2 | | | | | | |

TABLE 1-continued

| | | | | | | |
|---|---|---|---|---|---|---|
| 21 | 6.6 | 3 | 3.3 | 9.7 | ○ | Invention Example |
| 22 | 7.2 | 2 | 3.9 | 8.2 | ○ | Invention Example |

[1])proportion in terms of area (%) in nugget in which concentration m (mass %) of P is more than twice concentration M (mass %) of P of base metal composition

EXAMPLE 2

As an example of the present invention, as illustrated in FIG. 3, a resistance spot welded joint was formed by welding a sheet set, which included three lapped steel sheets (the lower steel sheet 1, the middle steel, sheet 2, and the upper steel sheet 3), by using a resistance welding machine. The resistance welding machine, which was attached to a welding gun, was of a servo motor pressing type using a single-phase current (50 Hz). As illustrated in FIG. 5, a pair of electrode tips (the lower electrode tip 4 and the upper electrode tip 5) used in this example were both DR-type electrodes made of an alumina-dispersed copper, each having an end portion having a radius of curvature of R40 and a diameter of 6 mm.

Table 2 shows sheet sets used as test pieces. Here, the strength is the tensile strength, a steel sheet that is "not coated" is a cold rolled steel sheet, and "GA" stands for a GA steel sheet. The coating weight of GA steel sheet was 45 g/mm². By using these steel sheets, welding and cross tension test were performed in accordance with JIS Z3137. In the cross tension test, tension was applied to the steel sheets 1 and 2.

In invention examples, resistance spot welding was performed in accordance with the embodiment of the present invention described above. In this case, as shown in FIG. 6, a non-welding step of pressing without welding was performed (for a non-welding time Tc), and re-welding step of applying an electric current (Ip1, Ip2) was performed twice (for post-step welding times Tp1 and Tp2).

In related-art examples, resistance spot welding including only a main step was performed.

Table 3 shows the welding conditions and the results of welding according to the invention examples and the related-art examples. Welding conditions that are not shown in this table (for example, squeeze time or slope time) were not set. It was confirmed that the nugget diameter was not increased as a result of performing post-step welding.

After welding was finished, on a plane passing through a nugget surrounded by a corona bond between the steel sheets 1 and 2, area analysis was performed using EPMA to obtain the distribution of P by observing five areas each having a size of 30 μm square, which were randomly selected from a region in the nugget surrounded by a closed curve at a distance d/100 from an end portion of a weld zone toward the inside of the nugget and a closed curve at a distance d/5 from the end portion of the weld zone toward the inside of the nugget, that is, an annular region at a distance in the range of d/100 to d/5 from the end portion of the weld zone. The proportion of a segregation portion in terms of area in which the amount of P therein is more than twice the amount M of P in the base metal P was evaluated.

Furthermore, cross tension test was performed on these joints and a load when fracture occurred was compared with each other. Cases where the tensile strength increased as compared with the related-art examples were classified as "O".

As a result, it was confirmed that, in the invention examples, the area in which P was highly concentrated decreased and the cross tension strength increased as compared with the related-art examples.

TABLE 2

| | Steel Sheet 1 | | | Steel Sheet 2 | | | Steel Sheet 3 | | |
|---|---|---|---|---|---|---|---|---|---|
| Sheet Set No. | Tensile Strength (MPa) | Coating | Thickness (mm) | Tensile Strength (MPa) | Coating | Thickness (mm) | Tensile Strength (MPa) | Coating | Thickness (mm) |
| A | 780 | not coated | 1.2 | 780 | not coated | 1.2 | 270 | GA | 0.6 |
| B | 980 | GA | 1.6 | 980 | GA | 1.6 | 270 | GA | 0.8 |
| C | 1180 | not coated | 2.0 | 1180 | not coated | 2.0 | 270 | GA | 0.8 |

GA; hot dip galvanized zinc alloy coating

TABLE 3

| | | Main Step | | | Post-step | | | | | | | | |
|---|---|---|---|---|---|---|---|---|---|---|---|---|---|
| Test No. | Sheet Set No. | Electrode force (kN) | Weld Current Im (kA) | Weld Time Tm (cycles) | Non-Weld Time Tc (cycles) | Weld Current Ip1 (kA) | Weld Time Tp1 (cycles) | Weld Current Ip2 (kA) | Weld Time Tp2 (cycles) | Area Proportion[1]) | Cross Tension Strength (kN) | Increase | Remark |
| 1 | A | 3.5 | 6.5 | 20 | — | — | — | — | — | 8 | 4.4 | — | Related-art Example |
| 2 | A | 3.5 | 6.5 | 20 | 6 | 4.6 | 3 | 6.5 | 3 | 3.4 | 6.5 | ○ | Invention Example |
| 3 | A | 3.5 | 6.5 | 20 | 8 | 5.2 | 3 | 5.9 | 3 | 3.8 | 7 | ○ | Invention Example |
| 4 | B | 3.5 | 6 | 18 | — | — | — | — | — | 8 | 7 | — | Related-art Example |
| 5 | B | 3.5 | 6 | 18 | 6 | 4.2 | 3 | 6.0 | 3 | 4.2 | 9.8 | ○ | Invention Example |
| 6 | B | 3.5 | 6 | 18 | 8 | 4.8 | 3 | 5.4 | 3 | 3.2 | 10.2 | ○ | Invention Example |
| 7 | C | 3.5 | 6 | 18 | — | — | — | — | — | 8 | 8.2 | — | Related-art Example |

TABLE 3-continued

| Test No. | Sheet Set No. | Electrode force (kN) | Main Step | | Post-step | | | | | Area Proportion[1] | Cross Tension Strength (kN) | Increase | Remark |
|---|---|---|---|---|---|---|---|---|---|---|---|---|---|
| | | | Weld Current Im (kA) | Weld Time Tm (cycles) | Non-Weld Time Tc (cycles) | Weld Current Ip1 (kA) | Weld Time Tp1 (cycles) | Weld Current Ip2 (kA) | Weld Time Tp2 (cycles) | | | | |
| 8 | C | 3.5 | 6 | 18 | 6 | 4.2 | 3 | 6.0 | 3 | 4 | 11.2 | ○ | Invention Example |
| 9 | C | 3.5 | 6 | 18 | 8 | 4.8 | 3 | 5.4 | 3 | 3.1 | 12.1 | ○ | Invention Example |

[1]proportion in terms of area (%) in nugget in which concentration m (mass %) of P is more than twice concentration M (mass %) of P of base metal composition

REFERENCE SIGNS LIST 1 lower steel sheet
2 upper steel sheet
3 sheet set
4 lower electrode tip
5 upper electrode tip
6 nugget
t total thickness (mm)
d nugget diameter

The invention claimed is:

1. A method of resistance spot welding thin steel sheets to form a welded joint therebetween, the method comprising:
    superimposing the thin steel sheets upon one another and performing a main resistance spot welding step to form a nugget formed from a base metal composition of the thin steel sheets, the nugget having (i) a diameter d on a horizontal plane passing through a center of the nugget surrounded by a corona bond, and (ii) a region on the same horizontal plane in the nugget surrounded by a closed curve at a distance d/100 from an end portion of a weld zone toward the inside of the nugget and a closed curve at a distance d/5 from the end portion of the weld zone toward the inside of the nugget;
    cooling the nugget formed in the main welding step; and
    performing two re-welding steps on the nugget, wherein an electric current for a first one of the two re-welding steps is set lower than an electric current for a second one of the two re-welding steps and an electric current for the main welding step, and wherein the electric current for the second one of the two re-welding steps is set higher than or equal to the electric current for the main welding step, a distribution of an amount of phosphorous (P) in the region of the nugget formed subsequent to the two re-weldings being analyzed by area analysis,
    wherein a proportion of the region, in terms of area in which the concentration m (mass %) of P is more than twice the concentration M (mass %) of P of the base metal composition of the thin steel sheets, is 5% or less.

2. The method according to claim 1, wherein a number of the thin steel sheets is three or more.

3. The method according to claim 2, wherein the cooling is performed for 0.08 s to 0.6 s.

4. The method according to claim 3, wherein the two re-weldings are performed for 0.4 s or less in total.

5. The method according to claim 2, wherein the two re-weldings are performed for 0.4 s or less in total.

6. The method according to claim 1, wherein the cooling is performed for 0.08 s to 0.6 s.

7. The method according to claim 6, wherein the two re-weldings are performed for 0.4 s or less in total.

8. The method according to claim 1, wherein the two re-weldings are performed for 0.4 s or less in total.

* * * * *